US012762338B1

(12) United States Patent
Samuel et al.

(10) Patent No.: US 12,762,338 B1
(45) Date of Patent: Oct. 13, 2026

(54) ANALYZING DOCUMENTS VIA A LARGE LANGUAGE MODEL, DETERMINING COMPLIANCE, AND GENERATING A NARRATIVE

(71) Applicant: INTUIT INC., Mountain View, CA (US)

(72) Inventors: John Samuel, Bangalore (IN); Gokul Elumalai, Bangalore (IN); Vishal Kumar Singh, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/193,388

(22) Filed: Apr. 29, 2025

(51) Int. Cl.
*G06F 40/30* (2020.01)
*G06F 40/226* (2020.01)
*G06F 40/35* (2020.01)
*G06Q 40/10* (2023.01)

(52) U.S. Cl.
CPC .......... *G06F 40/226* (2020.01); *G06Q 40/10* (2013.01)

(58) Field of Classification Search
CPC .... G06F 40/279; G06F 40/284; G06F 40/289; G06F 40/30; G06F 40/35; G06Q 40/00; G06Q 40/123
USPC .............................. 704/1, 9; 705/31; 706/12
See application file for complete search history.

(56) References Cited

U.S. PATENT DOCUMENTS

| | | | | |
|---|---|---|---|---|
| 9,418,385 | B1 * | 8/2016 | Wang | G06Q 40/10 |
| 10,387,969 | B1 * | 8/2019 | Wang | G06Q 40/123 |
| 11,854,092 | B1 * | 12/2023 | Nelson | G06Q 40/123 |
| 12,217,271 | B1 * | 2/2025 | Sardanopoli | G06Q 30/018 |
| 2003/0061131 | A1 * | 3/2003 | Parkan, Jr. | G06Q 40/123 705/30 |
| 2013/0174026 | A1 * | 7/2013 | Locke | G06F 40/166 715/254 |
| 2016/0140668 | A1 * | 5/2016 | Maguire | G06Q 40/123 705/31 |
| 2024/0403710 | A1 * | 12/2024 | Licato | G06N 20/00 |
| 2025/0078171 | A1 * | 3/2025 | Scenna | G06Q 40/123 |
| 2025/0111150 | A1 * | 4/2025 | Garapati | G06F 40/30 |
| 2025/0117863 | A1 * | 4/2025 | Zangrilli | G06F 40/30 |
| 2025/0131235 | A1 * | 4/2025 | Zangrilli | G06Q 40/123 |
| 2025/0139642 | A1 * | 5/2025 | Radhakrishnan | G06Q 30/018 |
| 2025/0209543 | A1 * | 6/2025 | Muthu | G06Q 40/123 |
| 2025/0238874 | A1 * | 7/2025 | Jia | G06Q 40/123 |
| 2025/0348664 | A1 * | 11/2025 | Dhindsa | G06F 40/20 |

(Continued)

*Primary Examiner* — Martin Lerner
(74) *Attorney, Agent, or Firm* — DLA Piper LLP US

(57) ABSTRACT

Embodiments of the disclosure are directed to systems and methods for providing personalized tax recommendations using LLMs. In particular, the disclosed system can utilize an LLM embedded within a tax software system to assist with generating cohesive, actionable advice tailored to specific financial scenarios, whether for individuals or companies. The LLM can be fine-tuned and specifically trained on a knowledge base of tax data. In some embodiments, by leveraging various advanced natural language processing capabilities, the disclosed LLM can comprehend, interpret, and transform complex tax information into understandable narratives that address specific user needs. Furthermore, a feedback loop can be used to enrich the model's accuracy and relevance, such as by continuously learning from user interactions and adapting to changes in laws and regulations. This can ensure communications remain precise and highly personalized.

16 Claims, 5 Drawing Sheets

(56) References Cited

U.S. PATENT DOCUMENTS

| | | | | |
|---|---|---|---|---|
| 2025/0363567 | A1* | 11/2025 | Dailey | G06Q 40/123 |
| 2025/0371262 | A1* | 12/2025 | Jayaram | G06F 40/20 |
| 2026/0023976 | A1* | 1/2026 | Samuel | G06N 20/00 |
| 2026/0073129 | A1* | 3/2026 | Rahimi | G06F 40/186 |

* cited by examiner

ANALYZING DOCUMENTS VIA A LARGE LANGUAGE MODEL, DETERMINING COMPLIANCE, AND GENERATING A NARRATIVE

BACKGROUND OF THE DISCLOSURE

The task of comprehensively managing and understanding complex tax data for both taxpayers and tax professionals is a challenging and ever-evolving task. While there are online platforms that can provide intelligence and assistance to users regarding their tax filings, such systems are generally limited to hybrid approaches that ultimately rely on professional and manual oversight for accuracy and compliance. Moreover, such systems are not able to harness the full capabilities of large language models, leading to decreased efficiency, speed, confusion, and errors, all of which are undesirable.

The drawings are not necessarily to scale, or inclusive of all elements of a system, emphasis instead generally being placed upon illustrating the concepts, structures, and techniques sought to be protected herein.

DESCRIPTION

The following detailed description is merely exemplary in nature and is not intended to limit the claimed invention or the applications of its use.

Embodiments of the disclosure are directed to systems and methods for providing personalized tax recommendations using LLMs. In particular, the disclosed system can utilize an LLM embedded within a tax software system to assist with generating cohesive, actionable advice tailored to specific financial scenarios, whether for individuals or companies. The LLM can be fine-tuned and specifically trained on a knowledge base of tax data. In some embodiments, by leveraging various advanced natural language processing capabilities, the disclosed LLM can comprehend, interpret, and transform complex tax information into understandable narratives that address specific user needs. Furthermore, a feedback loop can be used to enrich the model's accuracy and relevance, such as by continuously learning from user interactions and adapting to changes in laws and regulations. This can ensure communications remain precise and highly personalized.

The disclosed systems and methods offer various technical benefits to tax filing computing systems, such as more efficient tax management and enhanced decision-making support for users. The system can streamline the communication of tax-related information by enhancing accuracy, simplifying compliance, and providing personalized tax planning advice, thereby reducing confusion, errors, and the overall time spent on tax preparation and consultation.

Figure 1:
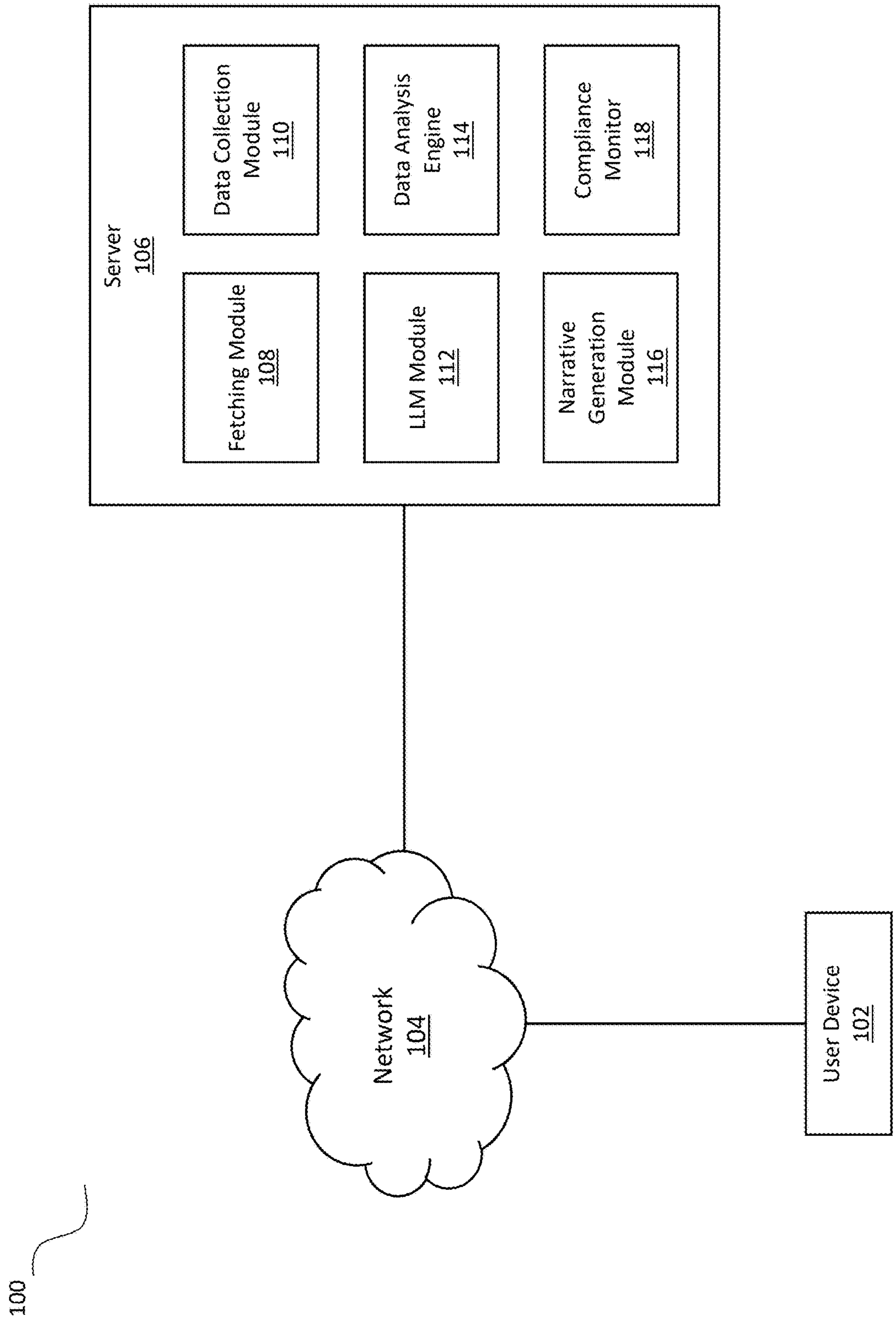
FIG. 1 is a block diagram of an example system for providing personalized tax recommendations using LLMs according to example embodiments of the present disclosure.

FIG. 1 is a block diagram of an example system 100 for providing personalized tax recommendations using LLMs according to example embodiments of the present disclosure. The system 100 can include one or more user devices 102 (generally referred to herein as a "user device 102" or collectively referred to herein as "user devices 102") that can access a server 106 via a network 104 to facilitate communication and engage with a tax software architecture. In some embodiments, the software architecture can allow a user (e.g., a taxpayer, tax professional, business owner, etc.) to perform various tax-related tasks, such as inquiring about deductions or other tax situations, prepare a tax return, etc. In some embodiments, software architecture can be a service with which the user can interact. In some embodiments, the software architecture can be an external, customer-facing service in which customers of a platform can provide requests and prompts and provide their own documents, such as tax or other financial documents. In some embodiments, the system 100 can include any number of user devices 102. For example, for a financial or accounting platform or other website that may offer services to users, there may be an extensive userbase with thousands or even millions of users that connect to the system 100 via their user devices 102.

A user device 102 can include one or more computing devices capable of receiving user input, transmitting and/or receiving data via the network 104, and or communicating with the server 106. In some embodiments, a user device 102 can be a conventional computer system, such as a desktop or laptop computer. Alternatively, a user device 102 can be a device having computer functionality, such as a personal digital assistant (PDA), a mobile telephone, a smartphone, or other suitable device. In some embodiments, a user device 102 can be the same as or similar to the computing device 500 described below with respect to FIG. 5.

The network 104 can include one or more wide areas networks (WANs), metropolitan area networks (MANs), local area networks (LANs), personal area networks (PANs), or any combination of these networks. The network 104 can include a combination of one or more types of networks, such as Internet, intranet, Ethernet, twisted-pair, coaxial cable, fiber optic, cellular, satellite, IEEE 801.11, terrestrial, and/or other types of wired or wireless networks. The network 104 can also use standard communication technologies and/or protocols.

The server 106 may include any combination of one or more of web servers, mainframe computers, general-purpose computers, personal computers, or other types of computing devices. The server 106 may represent distributed servers that are remotely located and communicate over a communications network, or over a dedicated network such as a local area network (LAN). The server 106 may also include one or more back-end servers for carrying out one or more aspects of the present disclosure. In some embodiments, the server 106 may be the same as or similar to server 400 described below with respect to FIG. 4.

As shown in FIG. 1, the server 106 can include a fetching module 108, a data collection module 110, an LLM module 112, a data analysis engine 114, a narrative generation module 116, and a compliance monitor 118.

In some embodiments, the fetching module 108 can be configured to fetch various tax-related information from a tax knowledge base. For example, the fetching module 108 can access various tax rules, deduction criteria, case studies, historical tax filings, and other relevant tax-documents and forms. In some embodiments, the fetching module 108 can utilize a cron job to perform its fetching tasks, and the fetched data can be stored in a data store (not shown). In some embodiments, the data fetched by the fetching module 108 can be utilized to fine-tune the LLM module 110. In addition, the fetching module 108 can be configured to regularly update the data store with the latest changes in tax legislation. This can ensure that the LLM module 110's training materials and generated advice remain relevant and accurate.

In some embodiments, the data collection module 110 can be configured to gather and organize tax data from various input sources received by the user device 102. For example, the data collection module 110 can receive, from the user device, invoices, income source documents, and other tax-related or financial documents. In addition, the data collection module 110 can be configured to organize the collected data into a structured format which can ultimately be fed as an input prompt to the LLM module 112. In some embodiments, the structured format can be a JSON or other similar format.

In some embodiments, the LLM module 112 can be configured to receive tax-related prompts and identify rules relevant to the tax situation described by the prompt. For example, in some embodiments, the LLM module 112 can be specifically trained on various tax data (e.g., data fetched by the fetching module 108). The LLM module 112 can be trained to parse intricate tax data and transform it into coherent, actionable narratives that are specific to individual situations. In some embodiments, the 112 module 110 can be configured to parse information from the prompt and analyze the collected tax information to identify key elements, patterns, and potential issues based on the data contained therein. For example, by identifying potential tax-saving opportunities and suggesting explicit actions, the system 100 can, overall, engage users more effectively, which can prompt more informed decisions and ensure higher compliance and response rates from within the user base. In some embodiments, the LLM module 112 can be trained to understand certain tax information such as what expenses are deductible, which income categories need what documentation, current tax rates and brackets, common tax scenarios and their treatments, etc. In some embodiments, the LLM module 112 can include an LLM, such as GPT-3, GPT-3.5, GPT-4, PaLM-E, Ernie Bot, LLaMa, and others. In some embodiments, the LLM can include various transformed-based models trained on vast corpuses of data that utilize an underlying neural network.

In some embodiments, unlike the training of general-purpose LLM's on broad internet, the disclosed LLM module 112 can be trained using meticulously curated datasets focused on tax information, such as 1) Tax Codes and Regulations: direct inclusion of the Internal Revenue Code (IRC), Treasury Regulations, IRS publications, and court rulings, which can involve careful structuring and potentially tagging of legal text for the LLM module 112 to understand hierarchical relationships and specific provisions; 2) Tax Forms and Instructions: feeding the LLM module 112 actual tax forms (e.g., Form 1040, Schedules, specialized forms like Form 8995) along with their official instructions, which can allow the LLM module 112 to learn the structure, data fields, and logic embedded within these documents; 3) Hypothetical Tax Scenarios and Solutions: creating synthetic data that represents various tax situations (ranging from simple to complex) with their corresponding correct tax treatment and form completion; which can help the LLM module 112 learn to connect user prompts to specific tax outcomes; and 4) Anonymized, Complete Tax Returns (for advanced tuning). As in the hypothetical, carefully anonymized complete tax returns can provide the LLM module 112 with a holistic view of how different tax concepts interact within a single filing. This can help the LLM module 112 understand complex scenarios involving multiple income sources, deductions, and credits.

In an example, instead of just reading about "capital gains," the LLM module 112 can be exposed to the specific language of IRC Section 1221, the instructions for Schedule D, and numerous examples of short-term vs. long-term capital gains calculations on actual forms.

In some embodiments, the tax-aware data augmentation can help more effectively train the LLM module 112. In some embodiments, augmenting the training data can include one or more of generating paraphrases of tax code sections in plain language; creating variations of tax scenarios with slightly different facts to test the LLM's understanding of nuances; and synthesizing common user queries related to specific tax topics.

In an example, if the training data includes "deductible medical expenses," augmentation could generate variations like "can I deduct doctor visits?", "are hospital bills tax deductible?", "what qualifies as a medical expense deduction?"

In some embodiments, tax-specific tokenization and vocabulary can help train the LLM module 112. In some embodiments, this can include tailoring the tokenization process to better handle tax-related terms, acronyms (e.g., AGI, IRA, HSA), and form identifiers. This can improve the LLM module 112's efficiency in processing tax-related text.

In an example, ensuring that "Qualified Business Income" (QBI) is treated as a meaningful unit rather than broken down into individual words can improve the LLM module 112's ability to understand discussions around the QBI deduction.

In some embodiments, the LLM module 112 can be tuned via instruction tuning with tax-specific tasks. In some embodiments, the LLM module 112 can be fine-tuned on a diverse set of tax-related instructions and their desired outputs. These instructions can be crafted to mimic real-world user interactions with tax software or advisors.

Example instructions can include one of more of the following: 1) "Based on the following income and expenses, identify all possible deductions." (followed by income/expense data); 2) "Explain the eligibility criteria for the Child Tax Credit;" 3) "Given this Schedule K-1, what is the taxpayer's share of qualified business income?" and 4) "Complete Form 8995 based on the following information." In some embodiments, such instructions can teach the LLM module 112 to follow tax-specific directions and generate relevant tax information or calculations.

In some embodiments, reinforcement learning from human feedback (RLHF) can be tailored for tax accuracy and compliance. In some embodiments, this can include utilizing human experts (e.g., tax professionals) to evaluate the LLM module 112's responses based on accuracy, completeness, adherence to tax law, and clarity of explanation. The reward signals used in RLHF can prioritize these tax-specific criteria.

In an example, if the LLM module 112 provides an answer about the deductibility of business expenses that is partially correct but misses a key limitation under a specific IRC section, human feedback can penalize this response, guiding the LLM module 112 to be more precise and comprehensive.

In some embodiments, the data analysis engine 114 can be configured to receive the identified one or more rules from the LLM module 112 and apply them to the tax or financial data and documents received from the user device 102.

In some embodiments, the narrative generation module 116 can be configured to generate a narrative based on the data analyzed and the output from the LLM module 112. In some embodiments, the narrative generation module 116 can be configured to convert the analyzed data into coherent, personalized tax communication narratives. Such narratives can include advice, explanations, and/or recommendations that are specifically tailored to the situation associated with the user's scenario.

In some embodiments, the compliance monitor 118 can be configured to check the results from the LLM module 112 and the narrative generation module 116 against current tax laws and regulations. In some embodiments, such comparisons can help ensure that recommendations and advice provided to user devices 102 is compliant and up-to-date. Moreover, since the fetching module 108 can continuously monitor updates to tax laws and regulations, the compliance monitor 118 can dynamically incorporate the latest changes and ensure that generated actions and recommendations align with current legislation.

Figure 2:
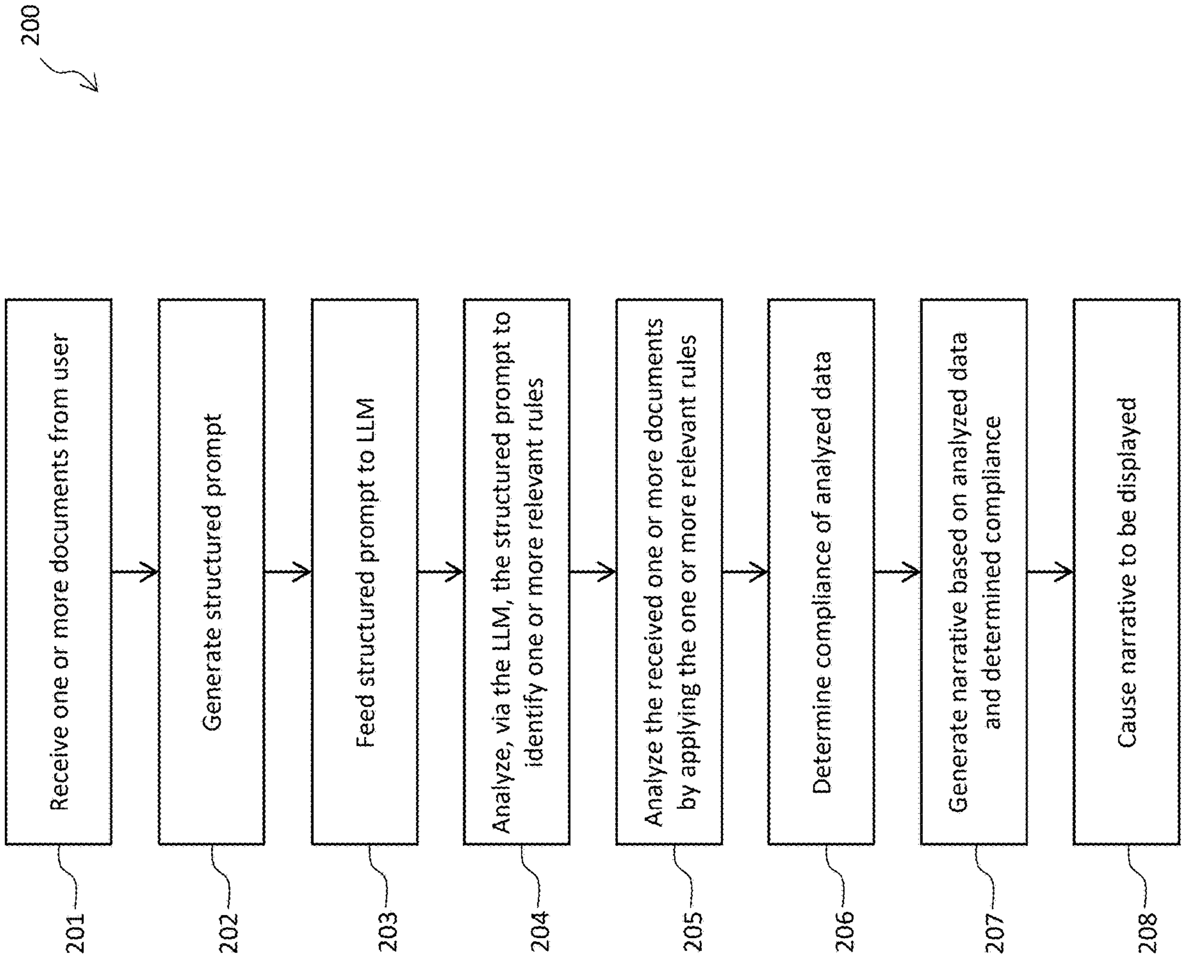
FIG. 2 is a flowchart of an example process for providing personalized tax recommendations using LLMs according to example embodiments of the present disclosure.

FIG. 2 is a flowchart of an example process 200 for providing personalized tax recommendations using LLMs according to example embodiments of the present disclosure. In some embodiments, the process 200 can be performed within the system 100, such as by the server 106 and its various modules. At block 201, the process 200 can include receiving, via the data collection module 110, one or more documents from a user device 102. For example, the user device 102 can upload an invoice, an income source document, and/or other tax or financial documents. At block 202, the process 200 can include generating, via the data collection module 110, a structured prompt based on the received one or more documents. In the example of an invoice being received, the data collection module 110 can generate the following exemplary JSON:

{
"income_type": "self_employed",
"business_address": "same as residential",
"annual_income": 75000,
"home_expenses": 24000
}.

In the example of an income source document being received, the data collection module 110 can generate the following exemplary JSON:

"formW2": {
"medicareTaxWithheldAmount": 650
"employeeName": "John Quincy",
"StateWages1": "250000.00",
"withholdingAmount": 50000,
"StateTax1": "18750.00",
"socialSecurityTaxAmount": 1500,
"State1Id": "55-9876543",
"socialSecurityWagesAmount": 150000,
"medicareWagesAndTipsAmount": 30000.

At block 203, the process 200 can include feeding, via the data collection module 110 the structured prompt to the LLM module 112. In some embodiments, the data collection module 110 can be further configured to query the LLM module 112, along with the structured data, for relevant rules and/or patterns. For example, the data collection module 110 could provide the following query to the LLM module 112: "What rules apply to self-employed home office?"

At block 204, the process 200 can include analyzing, via the LLM module 112, the structured prompt to identify one or more relevant rules. Example rules that the LLM module 112 can identify, as a result of its training and fine-tuning, rules that "Self-employed individuals working from home can deduct a portion of home expenses," "home office must be exclusively used for business," and "deductions are calculated based on square footage ratio."

At block 205, the process 200 can include analyzing, via the data analysis engine 114, the received one or more documents by applying the one or more relevant rules. For example, the data analysis engine 114 can apply the identified rules, such as the rules that apply to home offices, to the received document from the user device 102. In some embodiments, applying the one or more relevant rules to the document can include the rules, regulations, and calculation methods known by the LLM module 112. Specifically, the application of the rules can include extracting concrete data points from the documents and systematically connecting them to produce specific, actionable conclusions about the user's situation. For example, the data analysis engine 114 can identify a contextual trigger (i.e., a potential area for analysis based on the received input data). For example, the data analysis engine 114 can identify "income_type": "self-_employed" and "business_address": "same as residential." In addition, the data analysis engine 114 can formulate a rule query for the LLM module 112 based on the identified contextual trigger. An example query can be "What are the eligibility rules and calculation methods for the home office deduction for a self-employed individual?" or "Tax rules for self-employed home office." Moreover, example rules can include the following: 1) Must be self-employed; 2) Home office space must be used regularly and exclusively for business; 3) Deduction can be based on the percentage of the home used for business (e.g., square footage method); 4) Deductible expenses include a portion of rent/mortgage interest, utilities, insurance, repairs, etc.; and 5) Requires specific documentation (e.g., Form 8829, expense records). Once the data analysis engine 114 receives the relevant rules from the LLM module 112, the data analysis engine 114 can identify and extract the specific data points needed to evaluate these rules from the provided documents. In some embodiments, the data analysis engine 114 can identify any missing data beyond the relevant data, such as data about exclusive use and the percentage of home used for business.

In addition, the data analysis engine 114 can systematically check if the extracted data meets the conditions laid out in the rules. Examples of condition checking can include the following: 1) Is income_type=="self_employed"? Yes. Condition met; 2) (Exclusive Use): Does the data confirm exclusive use? No, this information is missing. The system might make a provisional assumption or flag this as needing verification (as seen later in Feedback Loop and Compliance Monitor). For the initial analysis, it might assume eligibility pending confirmation; 3) (Calculation Basis): The rule mentions percentage of use. The engine needs this percentage. Since it's missing, it cannot perform the final calculation accurately yet. However, it knows home_expenses are $24,000. It might make a placeholder estimate or use a common default percentage (e.g., assume 10% for a rough potential figure, or flag it). In example, it calculates potential_deduction: 6000. This implies it assumed or estimated a usage percentage (e.g., 6000/24000=25% usage); and 4) (Documentation): The engine notes the documentation required by the rule.

Then, the data analysis engine 114 can synthesize its findings into a structured output. An example output is shown below:

{
"eligible_for_home_office": true, //Based on available data, provisionally yes
"potential_deduction": 6000, //Calculated based on an assumed/estimated percentage
"required_documentation": ["home_floor_plan", "utility-_bills"],//From rules
"confidence_score": 0.95//High confidence *that a potential exists*, but might decrease if key data like 'exclusive use' is missing or negative.
}.

In some embodiments, there are various benefits to the data analysis engine 114 generating a structured output. For example, generating a structured output instead of a direct narrative enables modularity and a separation of concerns. This can ensure the system is robust and maintainable. Moreover, in terms of focus and accuracy, the tasks of the data analysis engine 114 are complex: interpreting intricate tax rules, applying them precisely to specific numerical data, and performing calculations. Its "expertise" can therefore be focused solely on the analytical correctness and completeness according to tax law. Mixing this with the nuances of human language, tone, and clarity can introduce errors or dilute the focus on analytical accuracy.

In addition, it can provide for testability benefits. It is generally easier to automatically test the output of the data analysis engine 114 for correctness when it includes structured data (e.g., "Did it calculate the deduction amount correctly based on inputs X, Y, Z?"). Testing the quality of a generated narrative can be more subjective and complex. Separating them can allow for independent, rigorous testing of the analytical part.

Another benefit includes maintainability. Tax laws can change frequently, and the data analysis engine 114 therefore frequently receives updates to reflect new rules or interpretations. Narrative strategies (how best to explain things) might evolve differently. Separating them can mean changes to tax logic don't necessarily require rewriting narrative logic, and vice-versa.

Another benefit includes the reusability of analysis. A structured analysis output can be used for purposes other than generating a narrative for the end user, such as feeding into automated form-filling modules or a simulation tool.

Another benefit includes auditability and compliance. Generally, a clear, structured output from the data analysis engine 114 can provide an unambiguous record of what the system determined before it was translated into potentially more interpretive human language. This can be valuable for tracking, debugging, and compliance audits.

In addition, separating the data analysis from the narrative generation can allow for different optimization goals. An LLM fine-tuned heavily for tax analysis can be optimized to understand legal jargon, identify relevant clauses in tax codes, perform logical deductions based on rules, and handle numerical data accurately. This is a different skill set than crafting empathetic, clear, and concise explanations for a layperson. Furthermore, a model hyper-focused on tax rules might naturally generate text that is overly technical, dense, or assumes a high level of prior knowledge from the reader. Its "instinct" might be to cite specific code sections rather than explain the practical implication. In some embodiments, even if using a single powerful LLM, different prompts would likely be used for the analysis task versus the narrative task. The analysis prompt could focus on rule application and calculation accuracy, while the narrative prompt could focus on clarity, tone, target audience, and summarizing key information effectively. It therefore can be more effective to use a dedicated process (or even a separate, differently tuned LLM or a simpler template-based system) specifically designed for narrative generation. This module can be explicitly trained or designed to prioritize clarity, user experience, and actionable advice, using the output of the specialized analysis engine as its factual basis.

At block 206, the process 200 can include determining, via the compliance monitor 118, a compliance of the analyzed data. For example, the data analysis engine can provide the following structured input to the compliance monitor 118:

{
"recommendation_type": "home_office_deduction",
"proposed_amount": 2000,
"taxpayer_situation": { . . . },
"current_tax_year": 2024
}.

The compliance monitor 118 can then compare the recommended actions or other advice to current tax laws and regulation to determine whether the output is compliant or not. In some embodiments, the compliance monitor 118 can receive the structured data that includes the proposed recommendation itself (e.g., recommendation_type: "home_office_deduction", proposed_amount: 2000); the relevant taxpayer data that supports or pertains to this recommendation (this is critical—it needs the specific facts, potentially including information gathered from the Feedback Loop); and the context, such as the current_tax_year, as rules can change annually.

Then, the compliance monitor 118 can identify governing rules such as Internal Revenue Code (IRC) sections (e.g., IRC Section 280A for Home Office, IRC Section 24 for Child Tax Credit); IRS publications and official guidance; specific thresholds, limits, and phase-outs for the given tax year; and internal consistency rules or policies defined within the system.

In some embodiments, the compliance monitor 118 can validate data against certain rules. For example, the compliance monitor 118 can systematically check if the provided data meets the requirements mandated by the identified governing rules, looking for conflicts and/or unmet conditions. For example, the compliance monitor 118 could provide the following checks: 1) Condition Checking: Does the data satisfy all mandatory conditions? (e.g., Rule: Home office must be used exclusively. Data: User feedback indicates same.); 2) Threshold/Limit Verification: Are income levels, contribution amounts, deduction amounts, etc., within the legally allowed ranges for the specific rule and tax year? (e.g., Rule: Roth IRA contributions phase out based on MAGI. Data: Taxpayer MAGI exceeds the limit.=>Conflict Found); 3) Dependency Checks: Does eligibility for this recommendation depend on another factor that isn't met? (e.g., Claiming a certain credit might require having earned income); and 4) Consistency with Other Data: Does the recommendation contradict other known facts about the taxpayer (e.g., recommending a deduction related to employment when the user is flagged as retired with only investment income)?

In some embodiments, the compliance determination can then be made based on the validation. Example determinations can include the following: 1) Compliant: All relevant rules and conditions are met by the provided data. The recommendation appears valid; 2) Needs Revision: The core idea of the recommendation might be valid, but the specifics (like the amount) need adjustment due to a rule (like an income phase-out), or a minor condition isn't fully documented but likely met; 3) Non-Compliant: A fundamental requirement of the governing rule is clearly violated by the available data. The recommendation, as proposed, is invalid; and 4) Needs More Information: The available data is insufficient to confirm compliance with a critical rule.

In some embodiments, if the status is not "Compliant," the compliance monitor 118 can pinpoint the specific rule(s) or data point(s) causing the issue. For example, the compliance monitor 118 could identify that "Exclusive use requirement (IRC Section 280A) not met due to shared space usage reported by user." or "MAGI exceeds 2024 limit for Roth IRA contribution."

Then, the compliance monitor 118 can produce the structured output detailing its findings, including the status, specific issues, the relevant regulations, and a corrected/alternative recommendation. In some embodiments, an example output from the compliance monitor 118 can include the following:

{
"compliance_status": "needs_revision",
"issues": ["exclusive_use_requirement_not_met"],
"updated_recommendation": "Partial home office deduction may not be allowed due to shared space usage. Consider reorganizing space for exclusive business use.",
"relevant_regulations": ["IRC Section 280A"]
}.

At block 207, the process 200 can include generating, via the narrative generation module 116, a narrative based on the analyzed data and the determined compliance. In some embodiments, the generating can include receiving a structured input from the data analysis engine 114 and the output from the compliance monitor 118. For example, in some embodiments, the narrative generation module 116 can translate the findings from the compliance monitor 118 (e.g., remediation guidance and requirements) into clearer user language. In some embodiments, the narrative generation module 118 can select a template for the compliance scenario described above (e.g., compliant, non-compliant now but potentially compliant later, etc.). In some embodiments, within non-compliant templates, the narrative generation module 116 can further differentiate based on the presence of fields like conditions_for_future_compliance. If present, the narrative generation module 116 can, for example, select a template designed for "non-compliant but potentially rectifiable" scenarios. If absent, the narrative generation module 116 can, for example, use a template for "non-compliant, likely final" scenarios.

Then, the narrative generation module 116 can use the relevant fields from the input to construct the narrative in a human-readable format. The narrative generation module 116 can explain reasoning behind non-compliance, provide guidance on the current actions, and inform the user about the conditions and requirements for potential future eligibility.

In some embodiments, the narrative generation module 116 can extract data from the structured input and map it to designated slots within the chosen template. For example, example mappings can be the following: 1) compliant_amount_current→States the currently allowed amount (e.g., $0); 2) conditions_for_future_compliance→Populates a section explaining how to become compliant; 3) requirements_if_compliant→Populates a section detailing what needs to be done (e.g., calculations, specific forms like Form 8829) if the user meets the conditions in the future; and 4) user_context.first_name→Personalizes the greeting.

In some embodiments, the templates themselves can contain logic to include or exclude specific sections based on the input data. For example, sections explaining how to become compliant or what's required if compliant can only be rendered if the corresponding input fields (conditions_for_future_compliance, requirements_if_compliant) are present and contain data. In some embodiments, this can ensure that irrelevant or inapplicable guidance is not shown to the user (e.g., no remediation steps are shown for a non-rectifiable issue like exceeding a MAGI limit).

In some embodiments, the narrative generation module 116 can utilize libraries of phrases to ensure clarity and potentially adjust the tone. For rectifiable issues, the tone might be more encouraging regarding future possibilities, while still being clear about the current limitations. In some embodiments, the narrative generation module 116 can apply formatting (e.g., bullet points for lists of conditions or requirements, bolding for key terms like Form 8829 or exclusive use) to enhance readability.

An exemplary input can include the following:

{
"finding_type": "tax_saving_opportunity",
"category": "home_office_deduction",
"current_status": "unclaimed",
"potential_savings": 2000,
"confidence_score": 0.95,
"supporting_evidence": {
"business_address": "matches_home_address",
"business_type": "self_employed",
"workspace_indicators": ["remote_work_receipts"]
}
}.

Moreover, an example narrative output generated by the narrative generation module 116 can include the following:

Primary Message: "We've identified a significant tax-saving opportunity for you!"

Detailed Explanation: "Based on your records, you're working from home but haven't claimed home office deductions. This could save you approximately $2,000 in taxes."

Action Items: [
"Measure your home office space",
"Gather utility bills from the past year",
"Complete Form 8829 for home office expenses"
].

At block 208, the process 200 can include causing the generated narrative to be displayed on the user device 102.

Figure 3:
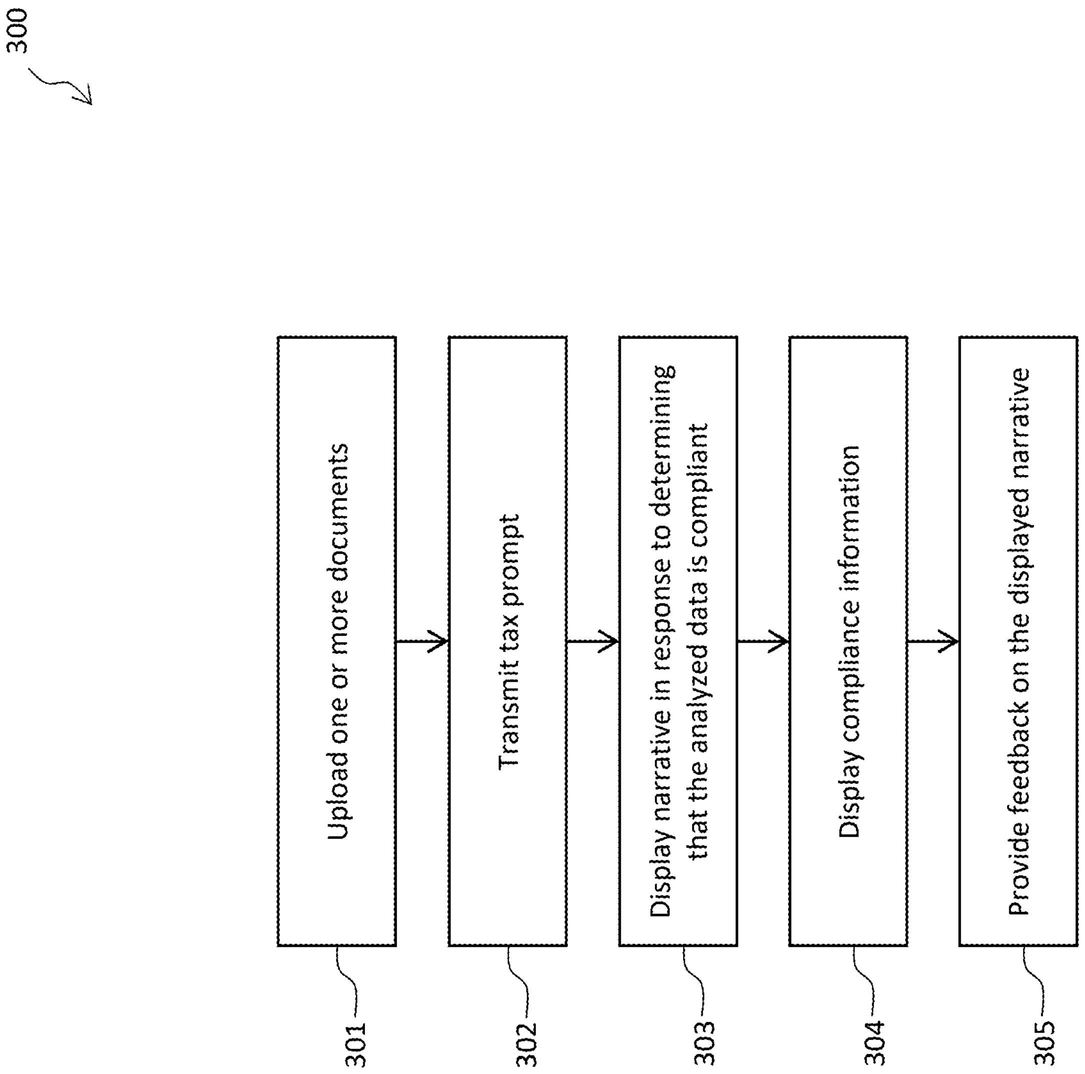
FIG. 3 is another flowchart of an example process for providing personalized tax recommendations using LLMs according to example embodiments of the present disclosure.

FIG. 3 is another flowchart of an example process 300 for providing personalized tax recommendations using LLMs according to example embodiments of the present disclosure. In some embodiments, the process 300 can be performed by a user device 102 within the system 100 of FIG. 1. At block 301, the process 300 can include uploading one or more documents to the server 106 for analysis. For example, the user device 102 can allow a user to access a tax preparation software. In some embodiments, the uploaded documents can include one or more of an income source document, an invoice, or other tax or finance related document. At block 302, the process 300 can include transmitting a tax prompt to the server 106, such as an inquiry about tax advice or recommended actions.

At block 303, the process 300 can include displaying a narrative including one or more recommended actions or pieces of advice in response to it being determined that the actions are compliant with current tax laws and regulations.

For example, the server 106 can analyze the documents and prompt with an LLM module 112, as discussed in relation to FIG. 2. The LLM module 112 can, as discussed above, be specifically trained on various tax data, such as case studies, deduction criteria, historical tax filings, etc. At block 304, the process 300 can include displaying compliance information related to the recommended actions. For example, the compliance information can include support in a tax code or other law or regulation supporting the recommended action. At block 305, the process 300 can include providing feedback on the displayed narrative from the user device 102 to the server 106. The received feedback can, in some embodiments, be used as part of a feedback loop to update the finetuning of the LLM module 112.

Figure 4:
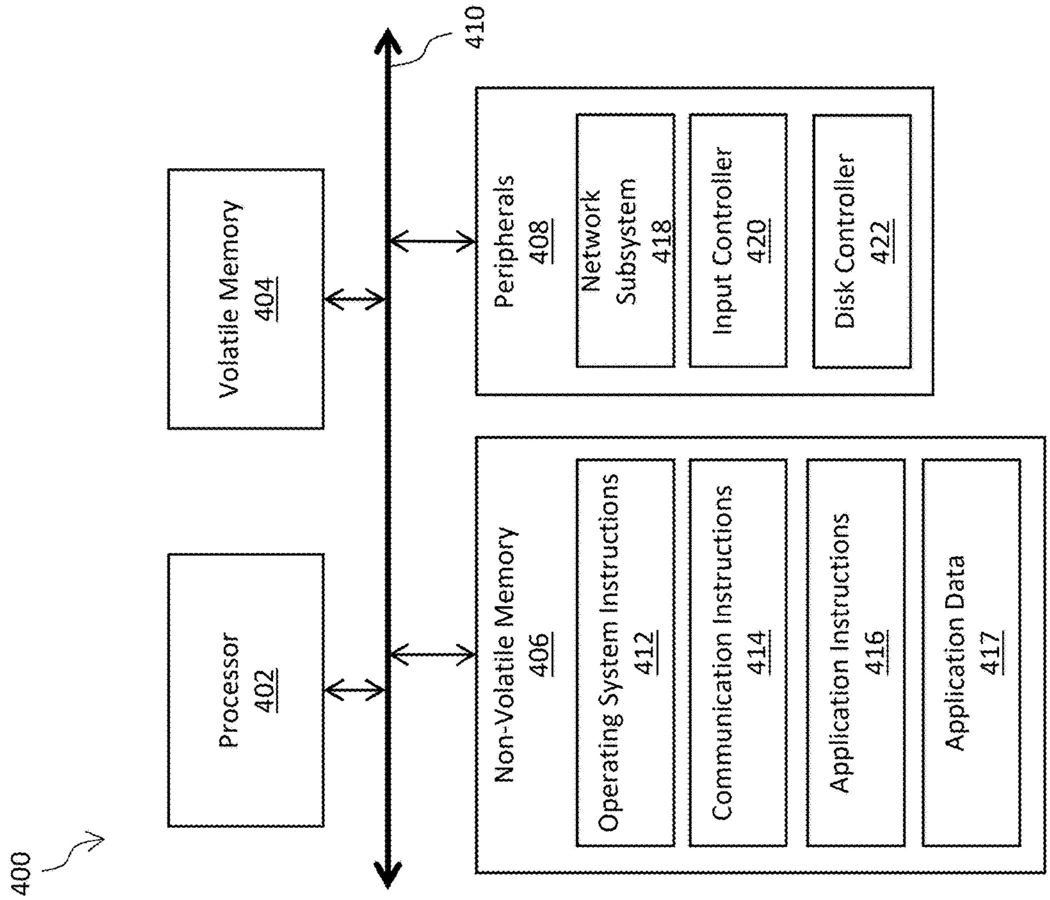
FIG. 4 is a diagram of an example computing device or server device.

FIG. 4 is a diagram of an example computing device or server device. Server 400 can implement various features and processes as described herein. Server 400 can be implemented on any electronic device that runs software applications derived from complied instructions, including without limitation personal computers, servers, smart phones, media players, electronic tablets, game consoles, email devices, etc. In some implementations, server 400 can include one or more processors 402, volatile memory 404, non-volatile memory 406, and one or more peripherals 408. These components can be interconnected by one or more computer buses 410.

Processor(s) 402 can use any known processor technology, including but not limited to graphics processors and multi-core processors. Suitable processors for the execution of a program of instructions can include, by way of example, both general and special purpose microprocessors, and the sole processor or one of multiple processors or cores, of any kind of computer. Bus 410 can be any known internal or external bus technology, including but not limited to ISA, EISA, PCI, PCI Express, USB, Serial ATA, or FireWire. Volatile memory 404 can include, for example, SDRAM. Processor 402 can receive instructions and data from a read-only memory or a random access memory or both. Essential elements of a computer can include a processor for executing instructions and one or more memories for storing instructions and data.

Non-volatile memory 406 can include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 406 can store various computer instructions including operating system instructions 412, communication instructions 414, application instructions 416, and application data 417. Operating system instructions 412 can include instructions for implementing an operating system (e.g., Mac OS®, Windows®, or Linux). The operating system can be multi-user, multiprocessing, multitasking, multithreading, real-time, and the like. Communication instructions 414 can include network communications instructions, for example, software for implementing communication protocols, such as TCP/IP, HTTP, Ethernet, telephony, etc. Application instructions 416 can include instructions for various applications. Application data 417 can include data corresponding to the applications.

Peripherals 408 can be included within server device 400 or operatively coupled to communicate with server device 400. Peripherals 408 can include, for example, network subsystem 418, input controller 420, and disk controller 422. Network subsystem 418 can include, for example, an Ethernet of WiFi adapter. Input controller 420 can be any known input device technology, including but not limited to a keyboard (including a virtual keyboard), mouse, track ball, and touch-sensitive pad or display. Disk controller 422 can include one or more mass storage devices for storing data files; such devices include magnetic disks, such as internal hard disks and removable disks; magneto-optical disks; and optical disks.

Figure 5:
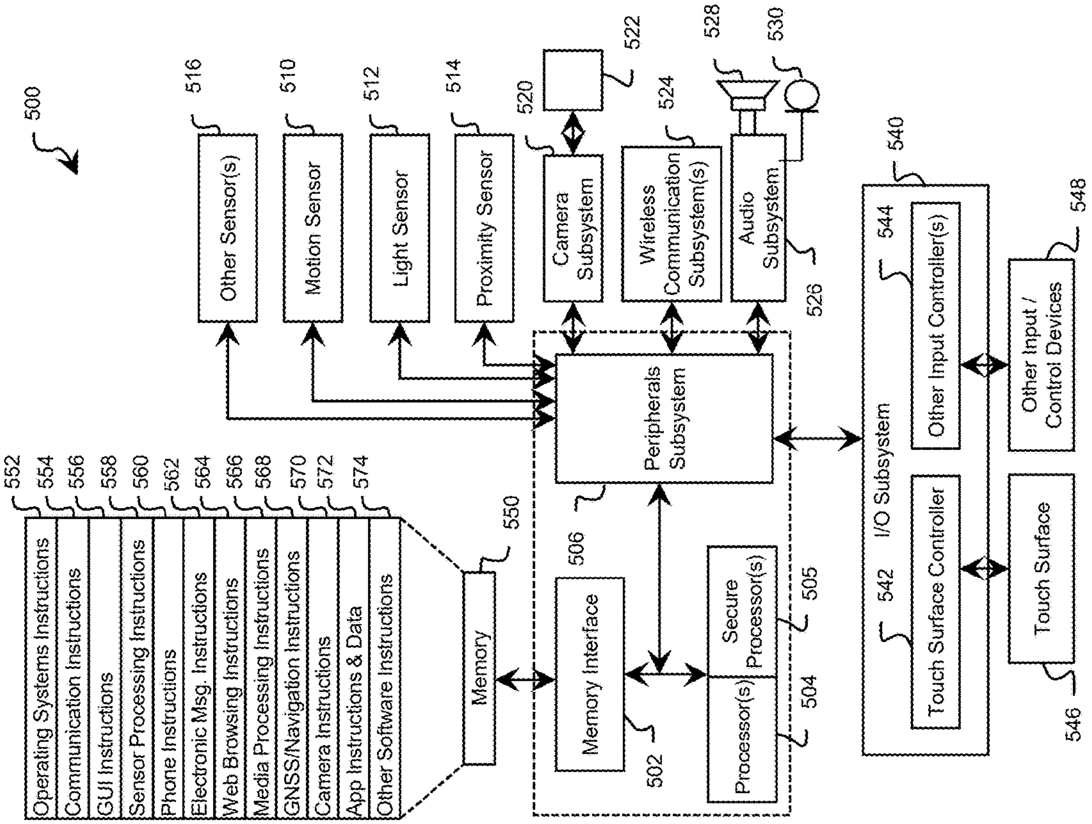
FIG. 5 is another example of a computing device.

FIG. 5 is another example of a computing device. The illustrative user device 500 can include a memory interface 502, one or more data processors, image processors, central processing units 504, and or secure processing units 505, and peripherals subsystem 506. Memory interface 502, one or more central processing units 504 and or secure processing units 505, and or peripherals subsystem 506 can be separate components or can be integrated in one or more integrated circuits. The various components in user device 500 can be coupled by one or more communication buses or signal lines.

Sensors, devices, and subsystems can be coupled to peripherals subsystem 506 to facilitate multiple functionalities. For example, motion sensor 510, light sensor 512, and proximity sensor 514 can be coupled to peripherals subsystem 506 to facilitate orientation, lighting, and proximity functions. Other sensors 516 can also be connected to peripherals subsystem 506, such as a global navigation satellite system (GNSS) (e.g., GPS receiver), a temperature sensor, a biometric sensor, magnetometer, or other sensing device, to facilitate related functionalities.

Camera subsystem 520 and optical sensor 522, e.g., a charged coupled device (CCD) or a complementary metal-oxide semiconductor (CMOS) optical sensor, can be utilized to facilitate camera functions, such as recording photographs and video clips. Camera subsystem 520 and optical sensor 522 can be used to collect images of a user to be used during authentication of a user, e.g., by performing facial recognition analysis.

Communication functions can be facilitated through one or more wired and or wireless communication subsystems 524, which can include radio frequency receivers and transmitters and/or optical (e.g., infrared) receivers and transmitters. For example, the Bluetooth (e.g., Bluetooth low energy (BTLE)) and/or WiFi communications described herein can be handled by wireless communication subsystems 524. The specific design and implementation of communication subsystems 524 can depend on the communication network(s) over which the user device 500 is intended to operate. For example, user device 500 can include communication subsystems 524 designed to operate over a GSM network, a GPRS network, an EDGE network, a WiFi or WiMax network, and a Bluetooth™ network. For example, wireless communication subsystems 524 can include hosting protocols such that device 500 can be configured as a base station for other wireless devices and or to provide a WiFi service.

Audio subsystem 526 can be coupled to speaker 528 and microphone 530 to facilitate voice-enabled functions, such as speaker recognition, voice replication, digital recording, and telephony functions. Audio subsystem 526 can be configured to facilitate processing voice commands, voice-printing, and voice authentication, for example.

I/O subsystem 540 can include a touch-surface controller 542 and or other input controller(s) 544. Touch-surface controller 542 can be coupled to a touch-surface 546. Touch-surface 546 and touch-surface controller 542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch-surface 546.

The other input controller(s) 544 can be coupled to other input/control devices 548, such as one or more buttons, rocker switches, thumb-wheel, infrared port, USB port, and or a pointer device such as a stylus. The one or more buttons (not shown) can include an up/down button for volume control of speaker 528 and or microphone 530.

In some implementations, a pressing of the button for a first duration can disengage a lock of touch-surface 546; and a pressing of the button for a second duration that is longer than the first duration can turn power to user device 500 on or off. Pressing the button for a third duration can activate a voice control, or voice command, module that enables the user to speak commands into microphone 530 to cause the device to execute the spoken command. The user can customize a functionality of one or more of the buttons. Touch-surface 546 can, for example, also be used to implement virtual or soft buttons and or a keyboard.

In some implementations, user device 500 can present recorded audio and or video files, such as MP3, AAC, and MPEG files. In some implementations, user device 500 can include the functionality of an MP3 player, such as an iPod™. User device 500 can, therefore, include a 36-pin connector and or 8-pin connector that is compatible with the iPod. Other input/output and control devices can also be used.

Memory interface 502 can be coupled to memory 550. Memory 550 can include high-speed random access memory and or non-volatile memory, such as one or more magnetic disk storage devices, one or more optical storage devices, and or flash memory (e.g., NAND, NOR). Memory 550 can store an operating system 552, such as Darwin, RTXC, LINUX, UNIX, OS X, Windows, or an embedded operating system such as VxWorks.

Operating system 552 can include instructions for handling basic system services and for performing hardware dependent tasks. In some implementations, operating system 552 can be a kernel (e.g., UNIX kernel). In some implementations, operating system 552 can include instructions for performing voice authentication.

Memory 550 can also store communication instructions 554 to facilitate communicating with one or more additional devices, one or more computers and or one or more servers. Memory 550 can include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic messaging-related process and functions; web browsing instructions 564 to facilitate web browsing-related processes and functions; media processing instructions 566 to facilitate media processing-related functions and processes; GNSS/Navigation instructions 568 to facilitate GNSS and navigation-related processes and instructions; and or camera instructions 570 to facilitate camera-related processes and functions.

Memory 550 can store application (or "app") instructions and data 572, such as instructions for the apps described above in the context of FIGS. 1-3. Memory 550 can also store other software instructions 574 for various other software applications in place on device 500.

The described features can be implemented in one or more computer programs that can be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions can include, by way of example, both general and special purpose microprocessors, and the sole processor or one of multiple processors or cores, of any kind of computer. Generally, a processor can receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A computer-implemented method, performed by at least one processor, comprising:

receiving one or more documents from a user device;

generating a structured prompt based on the one or more received documents;

feeding the structured prompt to a large language model (LLM);

analyzing, via the LLM, the received one or more documents to identify one or more relevant rules;

analyzing data from the one or more received documents by applying the one or more identified rules, wherein analyzing the one or more received documents by applying the one or more identified rules comprises:

extracting one or more data points from the one or more documents associated with the one or more identified rules;

determining whether the one or more extracted data points meets a condition defined in the one or more identified rules; and converting the determination into a structured output;

determining a compliance scenario of the analyzed data by analyzing the structured output;

generating a narrative based on the structured output of the analyzed data and the determined compliance scenario level, wherein generating the narrative based on the analyzed data and the determined compliance scenario comprises:

selecting a template based on the determined compliance scenario;

extracting data from the structured output;

mapping the extracted data to one or more designated slots within the identified template; and constructing a narrative based on the mapped data; and causing the generated narrative to be displayed on the user device.

2. The computer-implemented method of claim 1, wherein generating the structured prompt based on the one or more received documents comprises extracting tax information from the one or more received documents.

3. The computer-implemented method of claim 1, wherein analyzing, via the LLM, the received one or more documents to identify the one or more relevant rules comprises identifying the one or more relevant rules via an LLM fine-tuned on at least one of tax codes and regulations, tax forms, simulated tax scenarios and corresponding solutions, and tax return data.

4. The computer-implemented method of claim 3, wherein analyzing, via the LLM, the received one or more documents to identify the one or more relevant rules comprises parsing the structured prompt to identify one or more tax elements.

5. The computer-implemented method of claim 4, wherein applying the one or more identified rules comprises applying the one or more identified rules to the identified one or more tax elements.

6. The computer-implemented method of claim 3, comprising:

identifying at least one update to the tax codes and regulations; and re-finetuning the LLM.

7. The computer-implemented method of claim 1, comprising:

receiving feedback from the user associated with the displayed narrative; and refining the LLM based on the received feedback.

8. The computer-implemented method of claim 1, wherein determining the compliance scenario of the analyzed data comprises:

identifying one or more governing tax laws; and validating the analyzed data against the one or more governing tax laws by at least one of checking one or more conditions, verifying one or more tax-related thresholds, checking one or more dependencies, or identifying an inconsistency with previous tax data.

9. A computing system comprising:

a processor; and a non-transitory computer-readable storage device storing computer-executable instructions, the instructions when executed by the processor cause the processor to perform operations comprising:

receiving one or more documents from a user device;

generating a structured prompt based on the one or more received documents;

feeding the structured prompt to a large language model (LLM);

analyzing, via the LLM, the received one or more documents to identify one or more relevant rules;

analyzing data from the one or more received documents by applying the one or more identified rules, wherein analyzing the one or more received documents by applying the one or more identified rules comprises:

extracting one or more data points from the one or more documents associated with the one or more identified rules;

determining whether the one or more extracted data points meets a condition defined in the one or more identified rules; and converting the determination into a structured output;

determining a compliance scenario of the analyzed data by analyzing the structured output;

generating a narrative based on the structured output of the analyzed data and the determined compliance scenario, wherein generating the narrative based on the analyzed data and the determined compliance scenario comprises:

selecting a template based on the determined compliance scenario;

extracting data from the structured output;

mapping the extracted data to one or more designated slots within the identified template; and constructing a narrative based on the mapped data; and causing the generated narrative to be displayed on the user device.

10. The computing system of claim 9, wherein generating the structured prompt based on the one or more received documents comprises extracting tax information from the one or more received documents.

11. The computing system of claim 9, wherein analyzing, via the LLM, the received one or more documents to identify the one or more relevant rules comprises identifying the one or more relevant rules via an LLM fine-tuned on at least one tax codes and regulations, tax forms, simulated tax scenarios and corresponding solutions, and tax return data.

12. The computing system of claim 11, wherein analyzing, via the LLM, the received one or more documents to identify the one or more relevant rules comprises parsing the structured prompt to identify one or more tax elements.

13. The computing system of claim 12, wherein applying the one or more identified rules comprises applying the one or more identified rules to the identified one or more tax elements.

14. The computing system of claim 11, comprising:

identifying at least one update to the tax codes and regulations; and re-finetuning the LLM.

15. The computing system of claim 9, comprising:

receiving feedback from the user associated with the displayed narrative; and refining the LLM based on the received feedback.

16. The computing system of claim 9, wherein determining the compliance scenario of the analyzed data comprises:

identifying one or more governing tax laws; and validating the analyzed data against the one or more governing tax laws by at least one of checking one or more conditions, verifying one or more tax-related thresholds, checking one or more dependencies, or identifying an inconsistency with previous tax data.

* * * * *